July 26, 1955  R. W. POOLEY  2,713,699
METHOD OF MOLDING LIGHTWEIGHT CLOSED CELL MATERIAL
Filed Oct. 8, 1952

INVENTOR.
ROBERT W. POOLEY
BY Charles C. Willson
ATTORNEY

United States Patent Office 2,713,699
Patented July 26, 1955

2,713,699

METHOD OF MOLDING LIGHTWEIGHT CLOSED CELL MATERIAL

Robert W. Pooley, South Bend, Ind., assignor to United States Rubber Company, New York, N. Y., a corporation of New Jersey Application October 8, 1952, Serial No. 313,752

3 Claims. (Cl. 18—53)

This invention relates to an improved method of molding a lightweight closed cell thermoplastic material to provide an expanded material formed with numerous gas-expanded cells. The finished material contemplated by the present invention may be an elastic and resilient cellular material having good cushioning properties, or it may be a relatively hard stiff cellular material, as desired.

It has been proposed heretofore to produce a molded lightweight closed cell material by employing a platen mold having a bottom platen and a movable top platen and having placed therebetween a hollow moulding frame adapted to receive an uncured rubber composition containing a blowing agent, as disclosed in the Cuthbertson Patent No. 2,291,213. In such mold the top platen is closed under high hydraulic pressure against the molding frame, but due to the metal-to-metal contact, between the platens and frame some leakage of the high pressure gas within the mold will occur, and flashing may be produced by some of the uncured rubber stock being forced into the mold seams. When, due to such leakage a drop in gas pressure occurs near the side walls of the mold the expanding gas cells in this area may burst or otherwise produce a defective cell structure. This has frequently made it necessary heretofore to cut off one or two inches of the blown stock entirely around the finished cellular sheet and discard the same as defective.

The present invention contemplates a novel method whereby these difficulties experienced heretofore are overcome and flashing losses and defective blowing near the edges of the mold are avoided.

In carrying out the present invention the lightweight closed cell material may be formed of a rubber composition containing a blowing agent, or of a plastic composition containing a blowing agent, or it may be made of a mixture formed by combining a rubber and a resin and adding a blowing agent. In each case the material containing the blowing agent is thermoplastic when placed in the mold. It may, however, lose its thermoplastic property as a result of a subsequent heat treatment, as for example when the rubber is vulcanized.

For a further description of a rubber compound containing a blowing agent which may be employed in carrying out the present method, reference is had to the Cuthbertson patent above cited; and for a disclosure of a plastic material containing a blowing agent and which may be treated in accordance with the present method reference is had to the Smith Patent 2,525,965. For a combination of a rubber and resin composition which may be employed in carrying out the present invention reference is had to the Daly Patent 2,570,182. The novelty of the present invention resides not in the material used but in the construction and operation of the high pressure mold, whereby the air that is trapped therein when the mold is closed, and the blowing gas that first escapes from the stock within the mold can escape from the mold, but as soon as the stock within the mold blows appreciably and exerts pressure on the mold walls, the additional gas produced by the blowing agent is prevented from escaping from the mold.

This important result is obtained by employing a high pressure mold of usual construction, such for example as a platen mold having a bottom platen and a top platen and a hollow plastic-confining frame positioned therebetween, as employed heretofore. A novel feature of the present invention resides in providing in such a mold adjacent the side walls thereof entirely around the interior of the mold, a relatively thick elastic gasket which is so shaped that when the mold is first closed and the stock confined therein begins to blow under the application of heat, the air in the mold and some of the gas produced by the blowing agent may escape past the gasket and out through the mold seam, but as further expansion of the stock within the mold takes place it will press laterally against the gasket and force the gasket into sealing engagement with the walls of the mold. This automatic sealing of the mold as the blowing agent produces more gas will produce a uniform high pressure in the stock throughout the interior of the mold to blow the stock uniformly.

As a result of this invention the air in the mold which may tend to form pockets in the blowable material, if not permitted to escape during the blowing operation, is allowed to escape from the mold together with some gas produced in the early stage of the blowing operation, but as soon as the stock within the mold has blown appreciably the gasket serves to completely seal the interior of the mold so that a high gaseous pressure may be established throughout the confined stock to impart to the same a uniform closed cell structure throughout the entire area of the blown sheet.

The above and other features of the present invention will be further understood from the following description when read in connection with the accompanying drawing illustrating one form of apparatus which is well adapted to carry out the method of the present invention.

Figure 1:
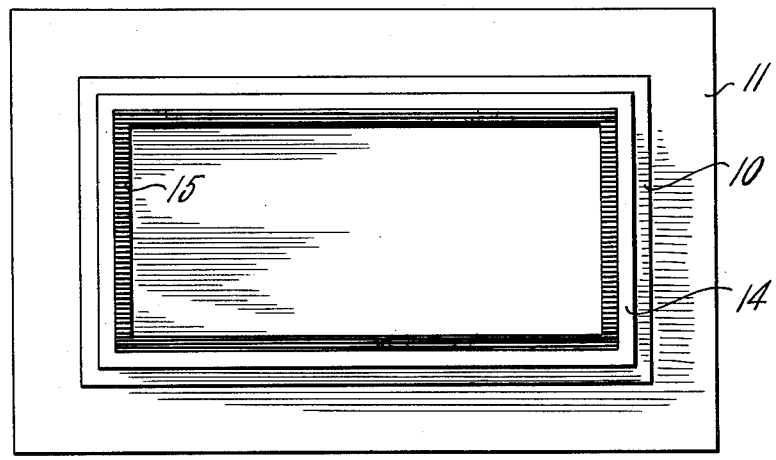
Fig. 1 is a top plan view of a platen mold, the top plate being omitted.
Figure 2:
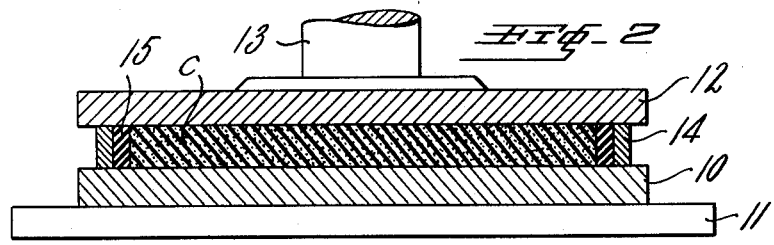
Fig. 2 is a vertical longitudinal sectional view through a platen mold employed to carry out the method of the present invention.
Figure 3:
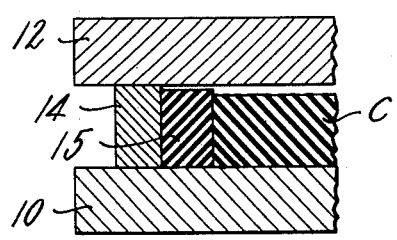
Figure 4:
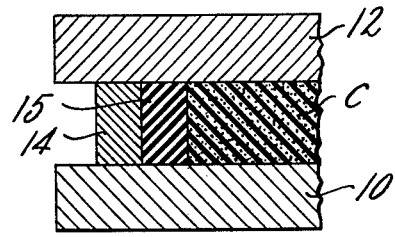

Fig. 3 on a larger scale is a view of portion of the platen mold of Fig. 2 showing the position of the gasket and blowable stock in the closed mold before the stock has blown; and Fig. 4 is a similar view showing the appearance of the gasket and stock as they appear after the blowable material has been blown by the application of heat, and high pressure is built up in the mold.

The method of the present invention may be carried out in various types of high pressure molds having a bottom wall, side walls and removable cover, but since the pressures involved in producing the molded lightweight closed cell material contemplated by the present invention may range from several hundred pounds per square inch to more than a thousand pounds per square inch a very strong mold structure is required if a molded article of any substantial size is to be produced therein. Therefore it is preferable, in most cases, to use a platen mold of well known construction and comprising a bottom platen 10 supported by any suitable structure such as a base plate 11, and a top platen 12 adapted to be raised and lowered by a hydraulic plunger 13, which is capable of exerting a very high closing pressure upon the platen mold. Between the platen plates 10 and 12 is placed a hollow molding frame such as the metal frame 14 that is strong enough to withstand the high internal pressures that are developed during the operation of blowing the thermoplastic material containing a blowing agent.

Enough blowing agent is commonly used to produce a high pressure in the mold and thereby produce a low density blown stock.

The construction so far described by reference numerals is or may be old. The novel feature of the present invention resides in a relatively thick elastic gasket 15 that extends entirely around the interior of a mold adjacent the side walls of the frame 14. This gasket preferably rests upon the bottom platen 10 as shown and extends upwardly in a vertical direction far enough to contact or nearly contact the top platen 12 when the mold is tightly closed, but the gasket does not at this time contact the top platen with sufficient force to completely seal the interior of the mold. This will be apparent from Fig. 3 in which the gasket 15 is shown as not quite contacting the lower face of the platen 12.

The mold consisting of the bottom platen 10, upper platen 12 and stock enclosing frame 14 and having the thick rubber gasket 15 disposed adjacent the side walls of the frame 14 is now ready to have a charge of thermoplastic material containing a blowing agent placed therein, such for example as the charge C which does not completely fill the mold as shown in Fig. 3, with the result that a small air space is formed in the mold above this charge. It is important that as the stock C blows under the application of heat to the mold all air trapped in the closed mold be permitted to escape therefrom, otherwise this trapped air will tend to form pockets or depression in the upper surface of the blown sheet C. When a metal-to-metal contact takes place, as when the upper platen 12 is seated forcibly against the frame 14 an airtight joint is not likely to be produced, unless some sealing material is provided between the surfaces just mentioned. Therefore in the absence of such sealing material air trapped within the mold can escape through the mold seam, which is desirable. But, as above stated, as the pressure within the mold increases the gas produced by the blowing agent will similarly escape and flashing may also be produced by some of the stock C being forced into the mold seam by the high internal pressure.

These difficulties are overcome in accordance with the present invention by providing the rubber gasket 15, that is constructed as above described, so that during the initial stages of the blowing operation the air and gas above the charge C shown in Fig. 3 of the drawing may escape over the upper edge of the gasket 15 and out through the mold seams. But as the material C continues to blow and expands in all directions, it will exert a strong horizontal pressure against the gasket entirely around the interior of the mold. This will cause the gasket to expand in a vertical direction under sufficient force to form a gastight seal, as shown in Fig. 4, entirely around the interior of the mold and thereby prevent further escape of the gas produced by the blowing agent within the stock C. When escapage of the gas within the mold is prevented by the gasket 15 a uniform pressure will be built up throughout the stock C during the rest of its blowing operation, to thereby form a uniform closed cell structure throughout the stock being molded.

The heat applied to the mold serves not only to blow the blowing agent within the stock C, but may serve also to effect a slight curing of the stock when such stock is formed of rubber, or if such stock is formed of a resin such for example as a vinyl plastisol, the heat may produce a partial fusing of the resinous material. If the stock C is formed of a mixture of rubber and resin the heat applied to the mold may vulcanize the former and fuse the latter to a slight degree.

The mold is then preferably allowed to cool to some extent after which it may be opened so that the molded cellular sheet stock may be removed therefrom. A further blowing of this stock may take place as it is freed from the confining pressure of the closed mold, or if the material is later heated to produce an added expansion of the gas in the closed cells a substantial increase in the size of the sheet stock may occur.

The gasket 15 should be made from a resilient material which is highly resistant to heat. The preferred materials are the polyacrylic ester rubbers such as a copolymer of ethyl acrylate and chloroethyl vinyl ether, which are highly resistant to oxidation. Neoprene may also be used but it is not as satisfactory as the material just mentioned. The hardness of the rubber forming the gasket is important because if it is too soft it will distort too much, and if it is too hard it will not seal off under the pressure exerted by the stock. The preferred hardness of the gasket is from 60 to 80 measured on the Shore durometer on the "A" scale.

The blowing agent used may be "Unicel ND" (40% dinitrosopentamethylenetetramine and 60% inert material) which builds up internal pressures around 400 pounds per square inch, but this blowing agent imparts to the material an objectionable odor. It therefore is desirable to use "Celogen" which is p,p'-oxy bis(benzene sulfonyl hydrazide). This material produces pressures of the range of 1,000 to 1,200 pounds per square inch. The reason a smaller quantity of "Celogen" is not used and thus reduce the pressure, is because some steam is produced, with the result that unless the blowing pressure is high, the pressure within the cells will decrease when the stock is cooled.

It will be seen from the foregoing that by employing a rubber gasket around the interior of the walls of the mold as above described, trapped air and gas are permitted to escape from the interior of the mold throughout the early stage of the blowing operation, which is desirable, but as soon as the charge within the mold has blown sufficiently to exert a substantial lateral pressure against such gasket it will expand vertically to completely seal the gas within the mold, so that a high pressure may be established therein as the blowing agent continues to decompose or gasify under the application of heat, and thereby produce a molded cellular material of uniform construction throughout the interior of the mold.

Having thus described my invention, what I claim and desire to protect by Letters Patent is:

1. The method of making a molded lightweight closed cell material in a high pressure mold having a bottom wall, side walls and a removable top wall, and having a thick elastic gasket therein covering the side walls and resting on the bottom wall, which comprises placing in the mold sufficient thermoplastic stock containing a blowing agent to nearly fill the mold, closing the mold under high pressure, supporting the top wall of the mold spaced sufficiently from the gasket to permit leakage between the top wall and the gasket, and heating the mold to blow the stock therein, whereby the air and gas in the mold will escape over the gasket and through the mold seams until the gasket is expanded vertically by the lateral pressure of the blowing stock thereagainst and seals the mold to build up high pressure therein as the blowing agent produces more gas.

2. The method of making a molded lightweight closed cell material, which comprises providing a platen mold having a hollow molding frame resting on the bottom platen and adapted to be engaged by the top platen under high pressure, providing a thick elastic gasket to cover the inner walls of said frame so that it rests on the bottom platen and extends upwardly close to the closed top platen and spaced from the latter sufficiently to permit leakage between the gasket and top wall, placing in the hollow frame enough thermoplastic stock containing a blowing agent to nearly fill the same, forcibly closing the top platen and heating the mold to blow the stock therein, so that the air and gas in the mold will escape over the gasket and frame until the gasket is expanded vertically by the lateral pressure of the blowing stock thereagainst and seals the mold to build up high pressure therein as the blowing agent produces more gas.

3. The method of making a molded lightweight closed cell material, which comprises providing a platen mold having a hollow molding frame resting on the bottom platen and adapted to support the top platen under high pressure, providing a thick elastic gasket to cover the inner walls of the frame so that it rests on the bottom platen and extends upwardly close to the closed top platen, placing in the hollow frame enough thermoplastic stock containing a blowing agent to nearly fill the same, forcibly closing the top platen on the molding frame while supporting the top platen on the frame in fluid leaking relation to the gasket to permit leakage between the top wall and the gasket, heating the mold to blow the stock therein, so that the air and gas in the mold will escape over the gasket and frame until the gasket is expanded vertically by the lateral pressure of the blowing stock thereagainst and seals the mold to build up high pressure therein as the blowing agent produces more gas.

References Cited in the file of this patent

UNITED STATES PATENTS

| | | |
|---|---|---|
| 2,172,243 | Goodnow | Sept. 5, 1939 |
| 2,524,039 | Carpentier | Oct. 3, 1950 |
| 2,558,823 | Crowley | July 3, 1951 |